United States Patent
Thomas et al.

(10) Patent No.: US 11,769,869 B1
(45) Date of Patent: Sep. 26, 2023

(54) BATTERY HAVING ZINC PLATED COPPER ELECTRODE AND METHOD OF MAKING THE SAME

(71) Applicant: Golden Gate Battery LLC, San Jose, CA (US)

(72) Inventors: Joy Vadakkan Thomas, Irinjalakuda P.O. (IN); Daiphi Davis, Thrissur (IN); Leya Mary Anto, Chalakudy (IN); Jessphin Joy, Irinjalakuda P.O. (IN); Saroj Kumar Sahu, San Jose, CA (US)

(73) Assignee: Golden Gate Battery LLC, San Jose, CA (US)

( * ) Notice: Subject to any disclaimer, the term of this patent is extended or adjusted under 35 U.S.C. 154(b) by 0 days.

(21) Appl. No.: 18/136,868

(22) Filed: Apr. 19, 2023

(51) Int. Cl.
*H01M 4/04* (2006.01)
*H01M 4/38* (2006.01)
*H01M 4/02* (2006.01)

(52) U.S. Cl.
CPC .......... *H01M 4/0452* (2013.01); *H01M 4/38* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| 10,944,113 | B1* | 3/2021 | McIntyre | H01M 4/667 |
| 2015/0372297 | A1* | 12/2015 | Kameyama | H01M 4/0452 |
| | | | | 429/405 |
| 2018/0226655 | A1* | 8/2018 | Arai | C25D 5/611 |
| 2022/0223856 | A1* | 7/2022 | Yang | H01M 10/36 |
| 2022/0320488 | A1* | 10/2022 | Morimitsu | H01M 4/42 |

OTHER PUBLICATIONS

Abstract and Introduction section of "Toward highly reversible aqueous zinc-ion batteries: nanoscale-regulated zinc nucleation via graphene quantum dots functionalized with multiple functional groups", by Weiwei Han, Hankyu Lee, Yuzhen Liu, Youjoong Kim, Huaqiang Chu, Guicheng Liu, and Woochul Yang, Chemical Engineering Journal, vol. 452, Part 2, Jan. 15, 2023, available at https://www.sciencedirect.com/science/article/abs/pii/S1385894722045697.

* cited by examiner

*Primary Examiner* — Tracy M Dove
(74) *Attorney, Agent, or Firm* — Chen-Chi Lin

(57) ABSTRACT

A method uses an apparatus for fabricating a zinc plated copper electrode for a zinc anode battery. The method comprises the steps of: placing a zinc sheet and a copper sheet in a container of the apparatus; applying a first positive potential to the copper sheet; applying a first negative potential to the zinc sheet; passing a first predetermined current density; applying a second positive potential to the zinc sheet; applying a second negative potential to the copper sheet; and passing a second predetermined current density.

12 Claims, 5 Drawing Sheets

BATTERY HAVING ZINC PLATED COPPER ELECTRODE AND METHOD OF MAKING THE SAME

FIELD OF THE INVENTION

This invention relates generally to a method of using an apparatus for fabricating a zinc plated copper electrode. More particularly, the present invention relates to the fabricated zinc plated copper electrode being placed in a zinc based electrochemical cell.

BACKGROUND OF THE INVENTION

Large scale consumption of fossil fuels has increased the levels of carbon dioxide in the atmosphere to alarming levels. The higher amount of carbon dioxide results in severe greenhouse effect leading to global warming and concomitant climate changes. Harvesting energy from renewable energy sources, such as solar or wind, have drawn worldwide attention. Nevertheless, these renewable energy sources are intermittent in nature. Hence developing rechargeable batteries for large scale energy storage is indispensable for reducing the global warming.

Rechargeable zinc-based batteries have attracted considerable interest in the recent years due to its low cost, high abundance, environmental friendliness, fast electrode kinetics, low toxicity, and high specific capacity (820 Ah/kg, 5855 Ah/m$^3$). Examples of zinc-based batteries include zinc-iron, zinc-bromine and zinc-air chemistries. However, zinc-based batteries have not been used on a commercial scale widely because the zinc anode suffers from some critical problems such as passivation, uneven zinc deposition during charging, dendrite formation, and irreversible hydrogen evolution on the zinc anode. These drawbacks limit the practical applications of zinc-air batteries. Passivation effect of zinc anode mainly occurs in alkaline electrolytes and it is due to the deposition of zinc oxide on an active surface. Dendrites are formed during charging due to uneven zinc deposition. These dendrites, which are usually needle shaped, eventually penetrate the separator and touch the cathode, resulting in short circuit and battery failure. The dendrites also physically and irreversibly detach from zinc anode resulting in decreased efficiency and capacity. Hydrogen evolution during repeated charge-discharge processes results in poor cycling life and low coulombic efficiency. Thus, if the drawbacks of zinc-based batteries have been overcome, the zinc based batteries would be highly feasible as high capacity secondary batteries.

Introduction section of "Toward highly reversible aqueous zinc-ion batteries: nanoscale-regulated zinc nucleation via graphene quantum dots functionalized with multiple functional groups", by Weiwei Han et al., Chemical Engineering Journal, Volume 452, Part 2, Jan. 15, 2023, (hereafter "Introduction section by Weiwei Han et al.") recites that "Current studies of anodes of aqueous ZIBs mainly focus on the modification of Zn metal and the introduction of electrolyte additives [ ]. Modifying the Zn metal can partially limit the dendrite formation and side reactions. Reported methods include surface coating, alloying, and optimization of the Zn structure, using materials such as artificial Sc$_2$O$_3$ [ ], β-polyvinylidene fluoride (β-PVDF) [ ], MXene [ ], ZnSe [ ], and 3D Zn foil [ ]. Nonetheless, the incompatibility of the artificial coatings with the Zn substrate may result in the coating layers being scraped off and Zn deposition beneath the coating layer can unavoidably weaken the adhesion between the coating layer and the Zn substrate during the stripping/plating process."

Introduction section by Weiwei Han et al. further recites that "Owing to its compatibility with existing battery technologies, the introduction of electrolyte additive is one of the most feasible procedures available today [ ]. Various additives have been developed to date, including inorganic (MnSO$_4$ [ ], LiCl [ ], monosodium glutamate [ ], and Zn$_3$(PO$_4$)$_2$ [ ]), and organic (dimethyl sulfoxide (DMSO) [ ], nicotinamide (NAM) [ ], trimethyl phosphate (TMP) [ ], polyethylene oxide (PEO) [ ], and polyacrylamide (PAM) [ ]) additives. Generally, electrolyte additives can assist in preventing dendrite formation in a variety of ways, including shielding the electrostatic field, increasing the number of Zn nucleation sites, tuning the Zn growth orientation, and regulating the solvation structure [ ]. For instance, PAM can help enhancing the Zn anode reversibility by altering the nucleation sites and overpotential [ ]. The Zn ions are transported to the surface via the acyl groups of the PAM molecules, which are adsorbed on a copper mesh substrate by the PAM molecules in the electrolyte. The electrostatic attraction of the PAM molecules to the Zn ions efficiently increases the number of nucleation sites and contributes to generating a uniform electric field. These beneficial features ensure that Zn grows uniformly and forms a homogeneous deposition surface. Despite their initial success, all these methods face significant technological challenges in terms of practical and scalable manufacturing. Therefore, the development of new electrolyte additives is still a critical task for extending the lifespan of Zn anodes, particularly at high current densities and areal capacities."

SUMMARY OF THE INVENTION

The Zn dendrite formation is ultimately caused by the inhomogeneity of Zn nucleation during the initial stages of zinc plating and manifests itself as tiny protrusions. To prevent dendrite growth and the parasitic side reactions on the zinc surface, modification of the zinc surface with a stable layer is an effective approach. A strategy is developed for preventing dendrite growth during zinc deposition on copper surfaces by modifying copper surface with a uniform Zn—Cu alloy protective layer via an in-situ oxidation reaction to strip copper ions followed by a reduction reaction to deposit Zn—Cu alloy. Compared with the unmodified copper surface, the Zn—Cu alloy coated copper surface promotes the uniform Zn deposition providing dendrite free morphology and it is attributed to the high binding energy of Zn—Cu alloy layer with Zn atoms. The parasitic hydrogen evolution reaction is also effectively suppressed by the initial Zn—Cu coating and excellent cycling stability over many cycles are obtained. The passivation effect of zinc surface, due to the formation of insulating zinc oxide on zinc surface in alkaline conditions, are also prevented by initial modification of copper surface. Thus, this instant disclosure provides a facile and effective method to suppress dendrite growth, parasitic hydrogen evolution reaction and passivation in alkaline solutions via an electrically controlled oxidation reduction reaction.

A method of using an apparatus for fabricating a zinc plated copper electrode for a zinc anode battery is disclosed. The method comprises the steps of: placing a zinc sheet and a copper sheet in a container of the apparatus; applying a first positive potential to the copper sheet; applying a first negative potential to the zinc sheet; passing a first predetermined current density; applying a second positive potential to the zinc sheet; applying a second negative potential to the copper sheet; and passing a second predetermined current density.

DETAILED DESCRIPTION OF THE INVENTION

Figure 1A:
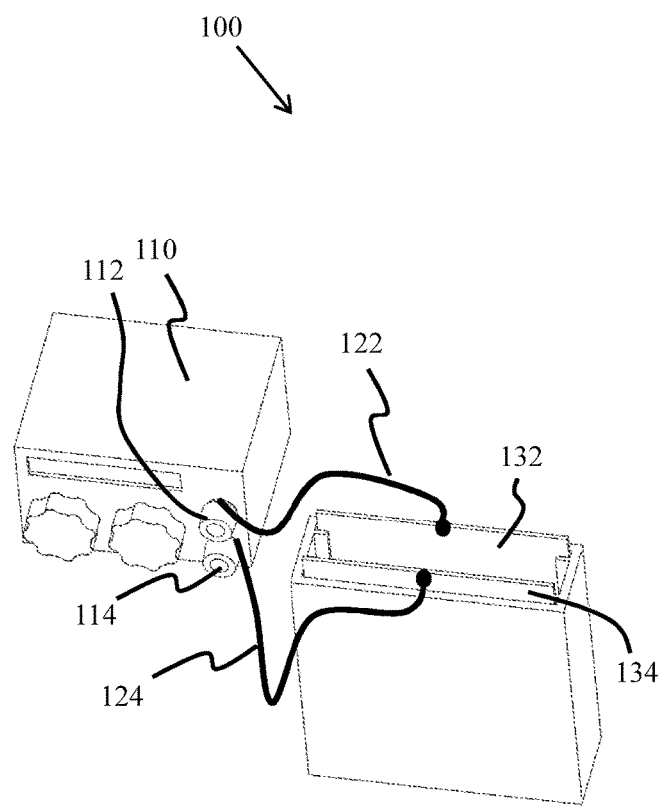
FIG. 1A is an isotropic view of a setup for electroplating electrodes in examples of the present disclosure.
Figure 1B:
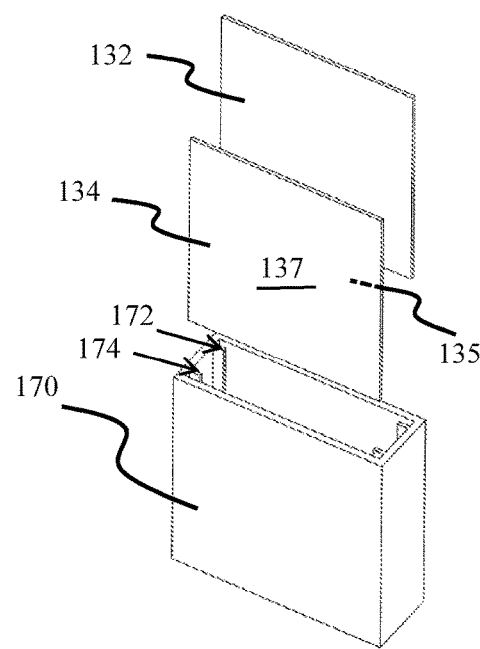
FIG. 1B is an exploded plot of a portion of the setup for electroplating electrodes in examples of the present disclosure.

FIG. 1A is an isotropic view of a setup 100 for electroplating electrodes in examples of the present disclosure. FIG. 1B is an exploded plot of a portion of the setup 100 for electroplating electrodes in examples of the present disclosure. The setup 100 comprises a direct current (DC) power supply 110 for electroplating, a first cable 122, a second cable 124, and a container 170. The DC power supply 110 comprises a first terminal 112 and a second terminal 114. In examples of the present disclosure, the first terminal 112 is a positive terminal. The second terminal 114 is a negative terminal. A first electrode (zinc sheet 132) is placed in the first slot 172 of the container 170. A second electrode (copper sheet 134) is placed in the second slot 174 of the container 170. In a process step, the first cable 122 connects the first electrode (zinc sheet 132) to the first terminal 112 of the DC power supply 110. The second cable 124 connects the second electrode (copper sheet 134) to the second terminal 114 of the DC power supply 110. In another process step, the first cable 122 connects the first electrode (zinc sheet 132) to the second terminal 114 of the DC power supply 110. The second cable 124 connects the second electrode (copper sheet 134) to the first terminal 112 of the DC power supply 110. The second electrode (copper sheet 134) comprises a first side 135 and a second side 137 opposite the first side 135.

In examples of the present disclosure, the second electrode (copper sheet 134) is made of a copper sheet having a surface dimension of 5 cm by 5 cm. The first electrode (zinc sheet 132) is made of a zinc sheet having a surface dimension of 5 cm by 5 cm. The container 170 contains a zinc salt solution or an alkaline solution of alkali metal zincate. In one example, the zinc salt solution is zinc sulfate ($ZnSO_4$) solution. In another example, the zinc salt solution is zinc nitrate [$Zn(NO_3)_2$] solution. In one example, the alkaline solution of alkali metal zincate is sodium zincate [$Na_2Zn(OH)_4$].

Figure 5:
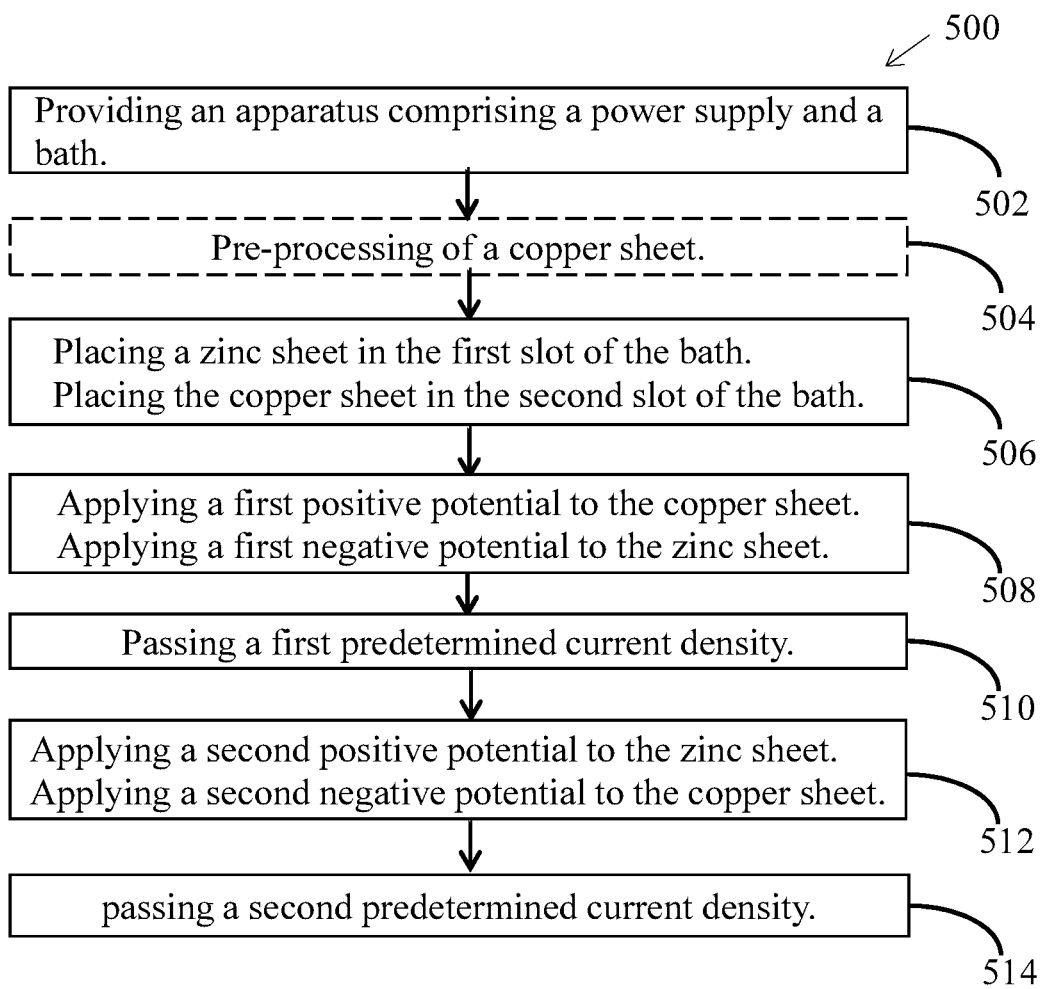
FIG. 5 is a flowchart of a process to plate an electrode of a cell in examples of the present disclosure.

FIG. 5 is a flowchart of a process 500 to plate an electrode of a cell in examples of the present disclosure. The process 500 may start from block 502.

In block 502, an apparatus is provided. In one example, the apparatus is the setup 100 of FIG. 1A. The container 170 comprises a first slot 172 and a second slot 174 (see FIG. 1B). In another example, the apparatus is the setup 200 of FIG. 2A. The container 270 comprises a first slot 272, a second slot 274, and a third slot 276 (see FIG. 2B). Block 502 may be followed by optional block 504 or block 506.

In optional block 504, a copper sheet 134 of FIG. 1 is pre-processed. The sub-steps to pre-process the copper sheet 134 of FIG. 1A include immersing an entirety of the copper sheet 134 of FIG. 1 in diluted nitric acid (0.1M); washing the copper sheet 134 of FIG. 1 with deionised water and acetone; and drying the copper sheet 134 of FIG. 1.

One side (second side 137 of FIG. 1B) of the copper sheet 134 of FIG. 1B is optionally laminated with a plastic film. The laminated plastic film may be removed after the step in block 514. Optional block 504 may be followed by block 506.

In block 506, a zinc sheet 132 of FIG. 1B is placed in the first slot 172 of FIG. 1B of the container 170 of FIG. 1B. The copper sheet 134 of FIG. 1B (either pre-processed in block 504 or not pre-processed in block 504) is placed in the second slot 174 of FIG. 1B of the container 170 of FIG. 1B. The zinc sheet 132 of FIG. 1B may be placed in the container 170 of FIG. 1B before, at the same time, or after the copper sheet 134 of FIG. 1B is placed in the container 170 of FIG. 1B. In examples of the present disclosure, the zinc sheet 132 of FIG. 1B is of a rectangular prism shape having a thickness less than one-tenth of a length. The copper sheet 134 of FIG. 1B is of a rectangular prism shape having a thickness less than one-tenth of a length. In one example, the container 170 (also being referred to as electrolytic cell) contains 2M $ZnSO_4$ solution. In another example, the container 170 contains zinc nitrate solution. In still another example, the container 170 contains an alkaline solution of alkali metal zincate like sodium zincate. In examples of the present disclosure, an entirety of each of the zinc sheet 132 of FIG. 1B and the copper sheet 134 of FIG. 1B is immersed in the solution contained in the container 170 of FIG. 1B. Block 506 may be followed by block 508.

In block 508, a first positive potential is applied to the copper sheet 134 of FIG. 1B. A first negative potential is applied to the zinc sheet 132 of FIG. 1B. The copper sheet 134 of FIG. 1B is connected to the positive terminal of the power supply 110 of FIG. 1A. The zinc sheet 132 of FIG. 1B is connected to the negative terminal of the power supply 110 of FIG. 1A. Block 508 may be followed by block 510.

In block 510, a first predetermined current density is passed between the copper sheet 134 of FIG. 1B and the zinc sheet 132 of FIG. 1B for a first predetermined period of time. In one example, a current 100 mA over 25 $cm^2$ area, representing a current density of 4 $mA/cm^2$ is passed between the two electrodes (the zinc sheet 132 of FIG. 1B and the copper sheet 134 of FIG. 1B) for 10 minutes. In another example, the current density is in a range from 2 $mA/cm^2$ to 6 $mA/cm^2$. The period of time is in a range from 5 minutes to 15 minutes. During this process, some copper is dissolved from the copper electrode (copper stripping process) into the aqueous electrolyte as copper sulphate. Block 510 may be followed by block 512.

In block 512, a second positive potential is applied to the zinc sheet 132 of FIG. 1B. A first negative potential is applied to the copper sheet 134 of FIG. 1B. The electrode connections, of block 508, to the power supply are reversed, so that, in block 512, the copper sheet 134 of FIG. 1B is connected to the negative terminal of the power supply 110 of FIG. 1A and the zinc sheet 132 of FIG. 1B is connected to positive terminal of the power supply 110 of FIG. 1A. Block 512 may be followed by block 514.

In block 514, a second predetermined current density is passed between the zinc sheet 132 of FIG. 1B and the copper sheet 134 of FIG. 1B for a second predetermined period of time. In one example, a current of 150 mA over 25 cm² area (representing 6 mA/cm²) is passed between the two electrodes (the zinc sheet 132 of FIG. 1B and the copper sheet 134 of FIG. 1B). In the step of block 514, zinc ions from the solution are deposited on the copper sheet 134 of FIG. 1B along with the copper ions (formed during initial oxidation process of the step of block 508) initially forming a Zn—Cu alloy on the surface of the copper sheet 134 of FIG. 1B. This electroplating process is continued until a deposit of desired thickness of zinc is formed on the Zn—Cu alloy coated surface of the copper sheet 134 of FIG. 1B. In one example, the electrodeposition continued till 0.2 mg/cm² of zinc was deposited on the surface of the copper sheet 134 of FIG. 1B, as measured by coulomb integration. In another example, the current density is in a range from 4 mA/cm² to 8 mA/cm². The period of time is in a range from 30 minutes to 600 minutes.

After the step of block 514, a zinc plated copper electrode is formed. The zinc plated copper electrode is the copper sheet 134 of FIG. 1B after copper stripping of the step of block 510 and zinc ion deposition on copper surface of the step of block 514. The zinc deposit was found to be dendrite free, as examined with optical microscopy and SEM.

Figure 2A:
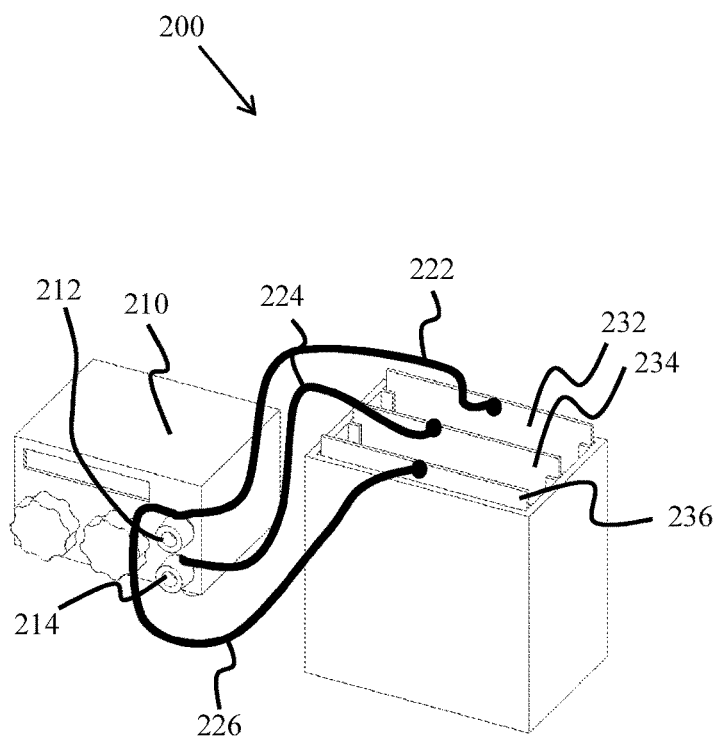
FIG. 2A is an isotropic view of another setup for electroplating electrodes in examples of the present disclosure.
Figure 2B:
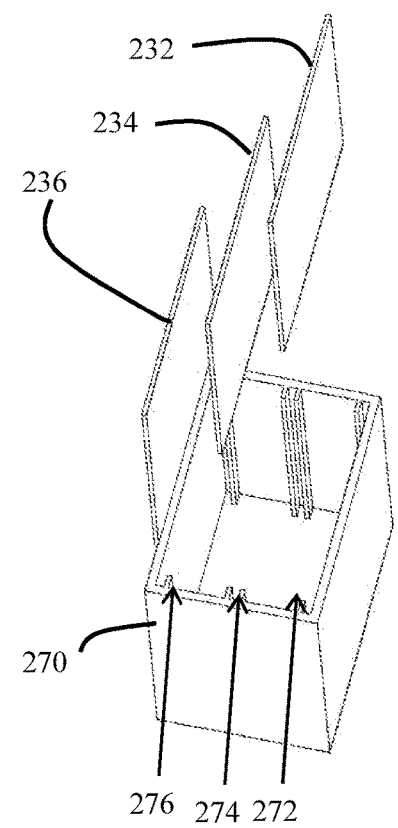
FIG. 2B is an exploded plot of a portion of the other setup for electroplating electrodes in examples of the present disclosure.

FIG. 2A is an isotropic view of a setup 200 for electroplating electrodes in examples of the present disclosure. FIG. 2B is an exploded plot of a portion of the setup 200 for electroplating electrodes in examples of the present disclosure. The setup 200 comprises a direct current (DC) power supply 210 for electroplating, a first cable 222, a second cable 224, a third cable 226, and a container 270. The DC power supply 210 comprises a first terminal 212 and a second terminal 214. In examples of the present disclosure, the first terminal 212 is a positive terminal. The second terminal 214 is a negative terminal.

A first electrode 232 is placed in the first slot 272 of the container 270. A second electrode 234 is placed in the second slot 274 of the container 270. A third electrode 236 is placed in the third slot 276 of the container 270. In a process step, the first cable 222 connects the first electrode 232 to the first terminal 212 of the DC power supply 210. The second cable 224 connects the second electrode 234 to the second terminal 214 of the DC power supply 210. The third cable 226 connects the third electrode 236 to the first terminal 212 of the DC power supply 210. In another process step, the first cable 222 connects the first electrode 232 to the second terminal 214 of the DC power supply 210. The second cable 224 connects the second electrode 234 to the first terminal 212 of the DC power supply 210. The third cable 226 connects the third electrode 236 to the second terminal 214 of the DC power supply 210.

The electrolytic cell (container) for producing such Zn plated copper electrodes can be arranged such that the Zn plating process may be conducted on one (see FIG. 1A) or both sides (see FIG. 2A) of the copper sheet. In the case of zinc plating desired on only one side (first side 135 of FIG. 1B), the other side (second side 137 of FIG. 1B) of the copper plate is laminated with a plastic film. The plastic film is removed after the plating is completed on the first side 135 of FIG. 1B. In the case of zinc plating desired on both sides (see FIG. 2A), the electrolytic cell (container 170 of FIG. 1B) is modified so that there are two sacrificial zinc electrodes (the first electrode 232 and the third electrode 236 of FIG. 2A). In this case, the central sheet (second electrode 234) is the copper electrode, and the two outer electrodes (the first electrode 232 and the third electrode 236) are sacrificial zinc sheets. Since the surface area of the second electrode 234 of FIG. 2A has effectively doubled, compared to the set up in FIG. 1A [one side (second side 137) of the second electrode (copper sheet 134) of FIG. 1B is laminated], the magnitude of the current is doubled for the electrodes of the same size, in order to keep the current density, the same. In examples of the present disclosure, the current for the setup 200 is 200 mA for the step of block 510 of FIG. 5 and is 300 mA for the step of block 514 of FIG. 5.

During discharging of the cell, discharge process is stopped just before the Zn—Cu alloy layer is stripped off the copper surface. This can be done by monitoring the voltage of the cell.

A zinc based cell may include an anode sheet that is fabricated by the method 500 after processing the copper sheet 134 of FIG. 1B or the copper sheet (second electrode 234) of FIG. 2B. In one example, the zinc based cell is a zinc bromine electrochemical cell. In another example, the zinc based cell is a zinc-air electrochemical cell. In still another example, the zinc based cell is a zinc-iron electrochemical cell.

Figure 3:
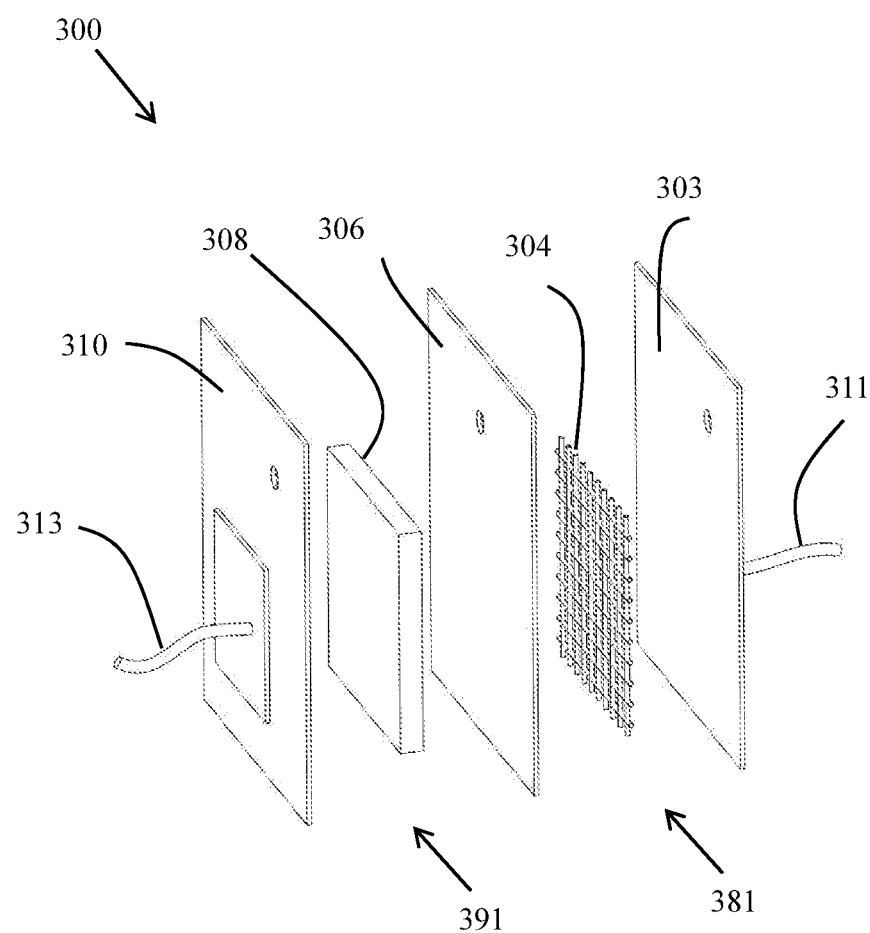
FIG. 3 is an exploded plot of a cell in examples of the present disclosure.

FIG. 3 is an exploded plot of a cell 300 in examples of the present disclosure. In examples of the present disclosure, the cell 300 is a rechargeable, zinc bromine electrochemical cell. The cell 300 comprises an anode-side subassembly 381, an insulating porous separator 306, and a cathode-side subassembly 391. The anode-side subassembly 381 comprises an anode current terminal 311, an anode sheet 303, and an anode insulating net 304 comprising a plurality of openings. The cathode-side subassembly 391 comprises a cathode graphite felt 308, a cathode sheet 310, and a cathode current terminal 313. The anode-side subassembly 381 and the cathode-side subassembly 391 are separated by the insulating porous separator 306. In one example, each element of the cell 300 is disposed by the order shown in FIG. 3. In examples of the present disclosure, the anode sheet 303 is fabricated by the method 500 after processing the copper sheet 134 of FIG. 1B or the copper sheet (second electrode 234) of FIG. 2B. The zinc plated surface of the anode sheet 303 faces the anode insulating net 304.

In examples of the present disclosure, the cell 300 is cycled at the rate of C/5 between 0.9V and 1.95V with an electrolyte containing 2M zinc bromide. No electrolyte additives were employed. The capacity of each cycle was measured.

Figure 4:
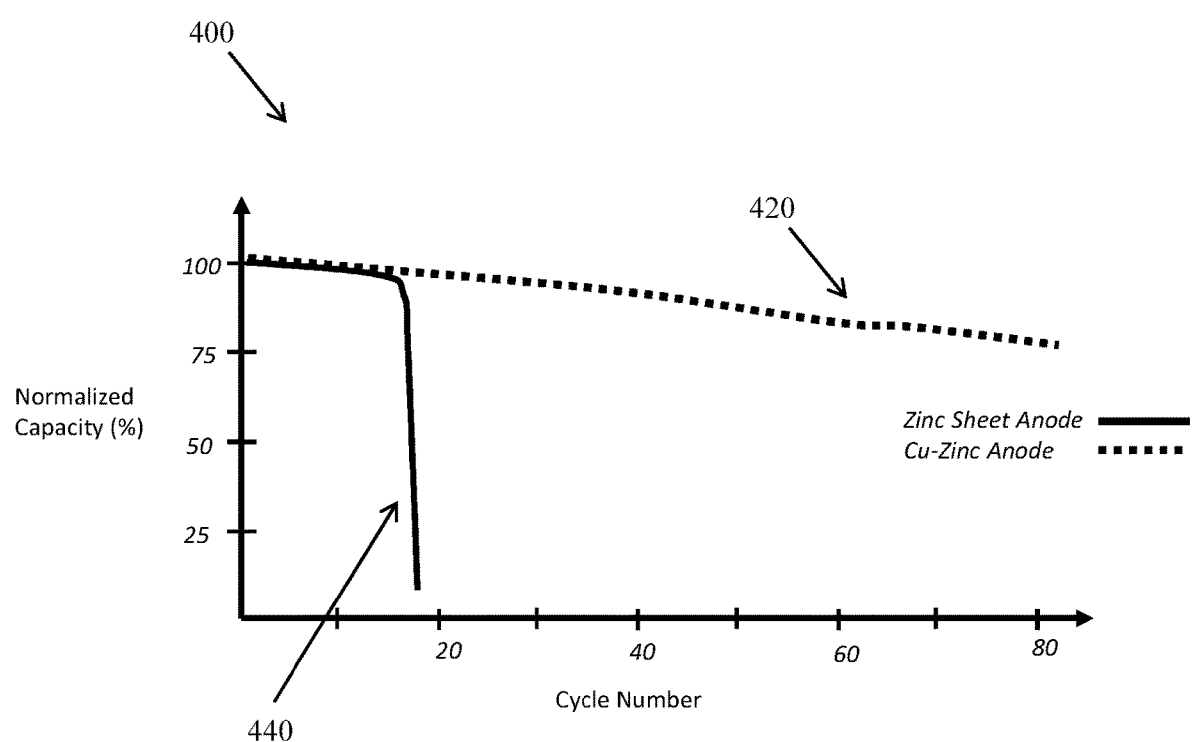
FIG. 4 is a capacity versus cycle number plot in examples of the present disclosure.

FIG. 4 is a capacity versus cycle number plot 400 in examples of the present disclosure. FIG. 4 shows the normalized capacity of the cell (vertical axis) as a function of cycle number (horizontal axis). Both types [zinc sheet anode (conventional type) and Cu—Zinc anode (fabricated using method 500 of instant disclosure)] show a gradual slow capacity loss, due to parasitic reactions such as hydrogen evolution. However, the zinc sheet anode (conventional type) shows an abrupt collapse of capacity at about the 16th cycle. A tear down of the cell indicated that zinc dendrites were the cause of this abrupt collapse of capacity (short-circuit). The cell containing the Cu—Zn anode (fabricated using method 500 of instant disclosure) continued the cycling beyond 80 cycles without any dendrite formation.

Those of ordinary skill in the art may recognize that modifications of the embodiments disclosed herein are possible. For example, the current density of block 510 or block 514 may vary. Other modifications may occur to those of ordinary skill in this art, and all such modifications are deemed to fall within the purview of the present invention, as defined by the claims.

The invention claimed is:

1. A method of using an apparatus for fabricating a zinc plated copper electrode for a zinc anode battery,
the apparatus comprising:
a power supply; and
a container comprising:
a first slot; and
a second slot;
the method comprising the steps of:
placing a zinc sheet in the first slot of the container;
placing a copper sheet in the second slot of the container;
applying a first positive potential to the copper sheet;
applying a first negative potential to the zinc sheet;
passing a first predetermined current density through the copper sheet and the zinc sheet for a first predetermined period of time;
applying a second positive potential to the zinc sheet;
applying a second negative potential to the copper sheet; and
passing a second predetermined current density through the copper sheet and the zinc sheet for a second predetermined period of time forming the zinc plated copper electrode.

2. The method of claim 1, wherein the power supply comprises:
a positive terminal; and
a negative terminal;
wherein the step of applying the first positive potential to the copper sheet comprises the sub-step of:
electrically connecting the copper sheet to the positive terminal of the power supply;
wherein the step of applying the first negative potential to the zinc sheet comprises the sub-step of:
electrically connecting the zinc sheet to the negative terminal of the power supply;
wherein the step of applying the second positive potential to the zinc sheet comprises the sub-step of:
electrically connecting the zinc sheet to the positive terminal of the power supply; and
wherein the step of applying the second negative potential to the copper sheet comprises the sub-step of:
electrically connecting the copper sheet to the negative terminal of the power supply.

3. The method of claim 1, wherein an internal volume of the container contains zinc sulphate solution having a molarity in a range from 0.5 Molar to 3.0 Molar.

4. The method of claim 1, wherein an internal volume of the container contains an zinc salt solution or an alkaline solution of alkali metal zincate.

5. The method of claim 4 further comprising: before the step of placing the copper sheet in the second slot of the container,
immersing the copper sheet in diluted nitric acid;
washing the copper sheet with deionised water and acetone; and
drying the copper sheet.

6. The method of claim 4, further comprising:
before the step of placing the copper sheet in the second slot of the container, laminating a side of the copper sheet with a plastic film; and
after the step of passing the second predetermined current density, removing the plastic film.

7. The method of claim 4, wherein the first predetermined current density is in a range from two $mA/cm^2$ to six $mA/cm^2$; and
wherein the first predetermined period of time is in a range from five minutes to fifteen minutes.

8. The method of claim 7, wherein the second predetermined current density is in a range from four $mA/cm^2$ to eight $mA/cm^2$; and
wherein the second predetermined period of time is in a range from thirty minutes to six hundred minutes.

9. The method of claim 4, wherein the container further comprises:
a third slot; and
wherein the method further comprises:
placing an other zinc sheet in the first slot of the container;
before the step of passing the first predetermined current density, applying the first negative potential to the other zinc sheet; and
after the step of passing the second predetermined current density, applying the second positive potential to the other zinc sheet.

10. The method of claim 9, wherein the power supply comprises:
a positive terminal; and
a negative terminal;
wherein the step of applying the first positive potential to the copper sheet comprises the sub-step of:
electrically connecting the copper sheet to the positive terminal of the power supply;
wherein the step of applying the first negative potential to the zinc sheet comprises the sub-step of:
electrically connecting the zinc sheet to the negative terminal of the power supply;
wherein the step of applying the first negative potential to the other zinc sheet comprises the sub-step of:
electrically connecting the other zinc sheet to the negative terminal of the power supply;
wherein the step of applying the second positive potential to the zinc sheet comprises the sub-step of:
electrically connecting the zinc sheet to the positive terminal of the power supply;
wherein the step of applying the second positive potential to the other zinc sheet comprises the sub-step of:
electrically connecting the other zinc sheet to the positive terminal of the power supply; and
wherein the step of applying the second negative potential to the copper sheet comprises the sub-step of:
electrically connecting the copper sheet to the negative terminal of the power supply.

11. The method of claim 4, wherein the zinc plated copper electrode is used as an anode sheet being placed in a cell comprising
an anode-side subassembly comprising
an anode current terminal;
the anode sheet; and
an anode insulating net comprising a plurality of openings;
an insulating porous separator;
a cathode-side subassembly comprising
a cathode graphite felt;
a cathode sheet; and
a cathode current terminal.

12. The method of claim 11 further comprising:
before the step of placing the copper sheet in the second slot of the container, laminating a first side of the copper sheet with a plastic film; and after the step of passing the second predetermined current density, removing the plastic film;

wherein a second side of the copper sheet opposites the first side of the copper sheet; and wherein the second side of the copper sheet faces the anode insulating net.

* * * * *